United States Patent
Lupke et al.

[19]

[11] Patent Number: 6,155,813
[45] Date of Patent: Dec. 5, 2000

[54] PIPE MOLDING APPARATUS WITH AIR ASSIST OF PLASTIC ONTO COOLING PLUG

[76] Inventors: Manfred A. A. Lupke, 92 Elgin Street, Thornhill, Ontario, Canada, L3T 1W6; Stefan A. Lupke, 32 Vintage Lane, Thornhill, Ontario, Canada, L3T 1X6

[21] Appl. No.: 09/050,922

[22] Filed: Mar. 31, 1998

[30] Foreign Application Priority Data

Mar. 9, 1998 [CA] Canada ................................ 2,231,624

[51] Int. Cl.$^7$ .................................................. B29C 47/90

[52] U.S. Cl. .................. 425/326.1; 425/336; 425/384; 425/387.1; 425/392; 425/396; 425/464

[58] Field of Search ................................ 425/133.1, 233, 425/325, 326.1, 336, 384, 387.1, 392, 396, 463, 464, 466

[56] References Cited

U.S. PATENT DOCUMENTS

| | | | |
|---|---|---|---|
| 4,510,013 | 4/1985 | Lupke et al. | 425/396 |
| 5,320,797 | 6/1994 | Hegler et al. | 425/396 |
| 5,405,569 | 4/1995 | Lupke | 425/396 |

*Primary Examiner*—Harold Pyon
*Assistant Examiner*—Joseph Leyson

[57] ABSTRACT

A pipe molding apparatus for forming double walled plastic pipe comprises an extruder which feeds first and second parisons of flowing plastic material to a moving mold tunnel to make respectively the outer and inner walls of the pipe. The moving mold tunnel includes a cooling plug over which the second parison moves to form the inner pipe wall while the outer wall of the pipe is formed against the interior surface of the mold tunnel. An air assist is provided internally of and helps to move the inner parison onto the cooling plug.

5 Claims, 6 Drawing Sheets

PIPE MOLDING APPARATUS WITH AIR ASSIST OF PLASTIC ONTO COOLING PLUG

FIELD OF THE INVENTION

The present invention relates to a pipe mold including a cooling plug interiorly of the mold tunnel.

BACKGROUND OF THE INVENTION

It is known in the pipe molding art to use a cooling plug to cool the pipe while it is in the mold tunnel. The use of cooling plugs has substantial benefits when making double wall pipe where the inner wall of the pipe slides over the exterior surface of the cooling plug.

Again, according to known practice, the inner wall of the pipe is fed as a stream of molten parison from the extruder into the mold tunnel. Often times the leading edge of the cooling plug will tend to mar the inner surface of the parison as the parison is forced onto the cooling plug. This will result in unwanted distortion in the form of abrasions and scratches, etc. to the interior surface of the inner wall of the double walled pipe.

SUMMARY OF THE INVENTION

The present invention relates to pipe molding apparatus for forming double wall pipe including an air assist to help movement of a plastic parison onto a cooling plug to reduce interior wall damage normally caused by a cooling plug during formation of the pipe.

More specifically, the present invention provides apparatus for forming plastic pipe having an outer wall with alternating crests and troughs therealong and a flat inner wall having spaced apart wall regions adhered to the troughs in the outer wall. The apparatus comprises an extruder having an extruder head which feeds outer and inner wall forming first and second parisons of flowing plastic material to a moving mold tunnel. The moving mold tunnel has an interior surface to shape the outer wall of the pipe. Provided within the mold tunnel is a cooling plug over which the second parison of plastic material moves with the cooling plug being sized to urge the second parison outwardly towards the first parison while the first parison is forced against the interior surface of the mold tunnel. The cooling plug preferably has a forward neck which is tapered inwardly towards the extruder head. An air assist is provided along the neck interiorly of and helps the second parison to move onto the cooling plug. This results in substantially eliminating damage to the internal surface of the second parison which might otherwise be caused by the front end of the cooling plug.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
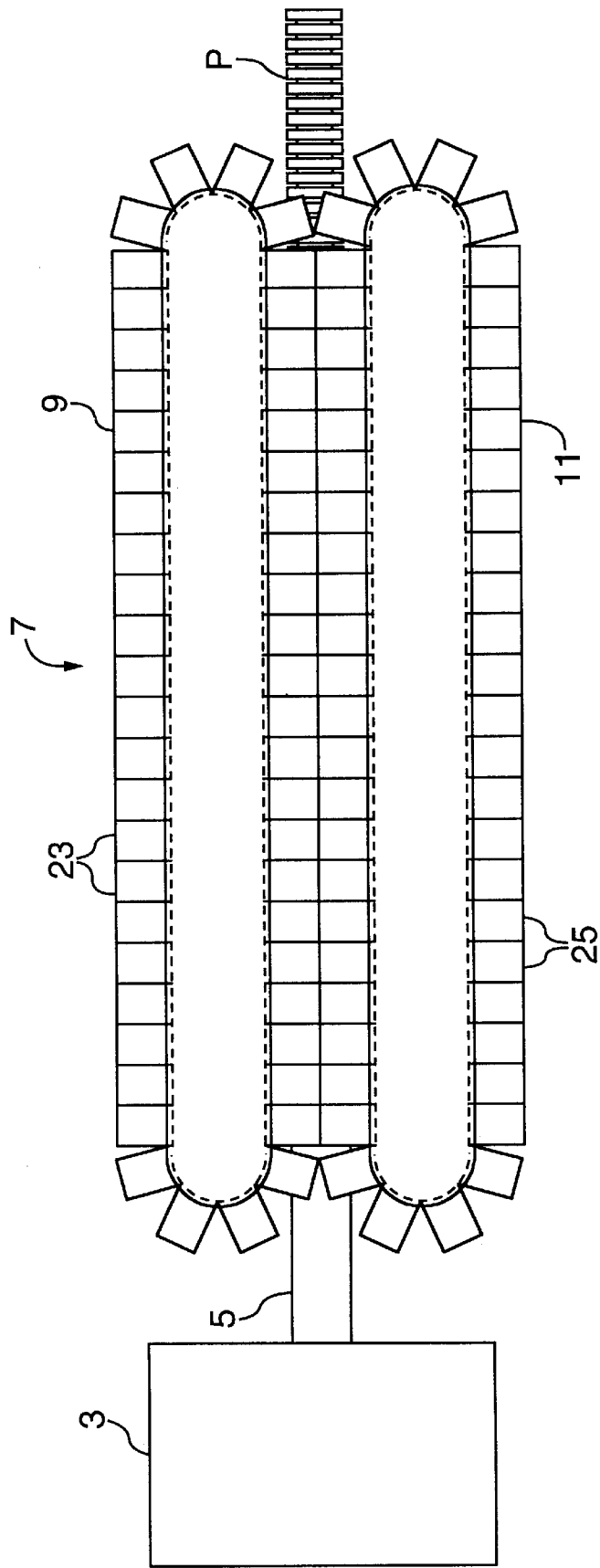
FIG. 1 is a schematic view of a pipe molding apparatus.
Figure 4:
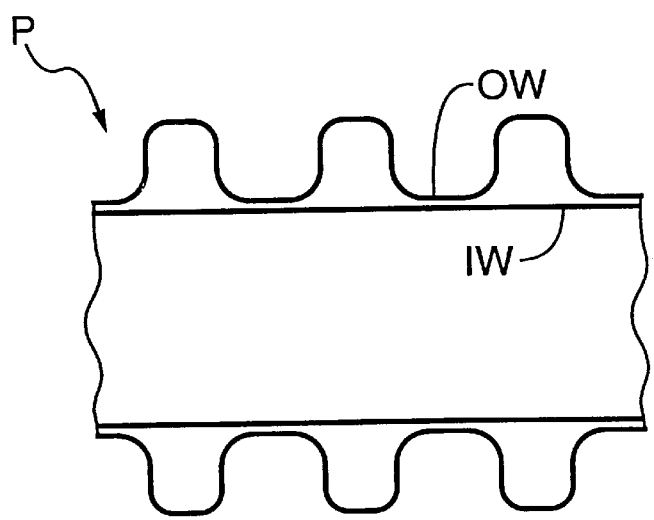
FIG. 4 is a sectional view through a pipe as made from the apparatus of FIGS. 1 through 3.
Figure 5:
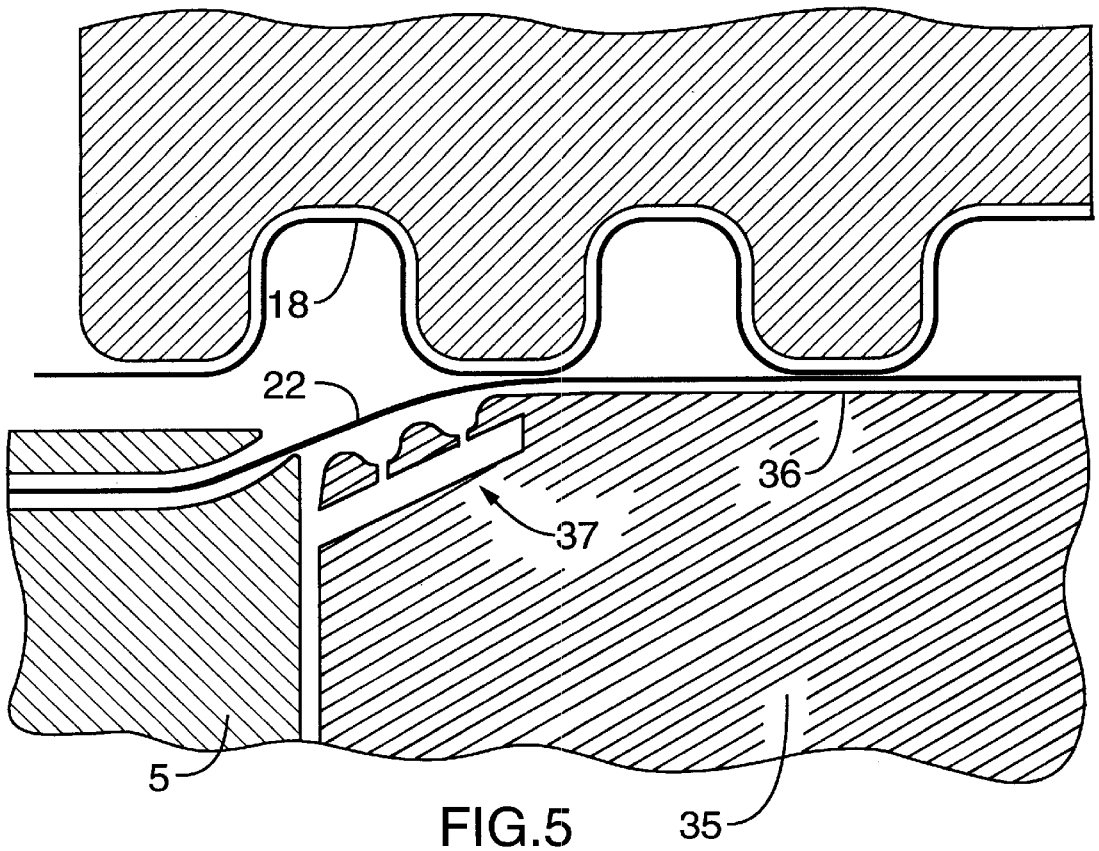
FIG. 5 is an enlarged sectional view of the forward end of a mold tunnel showing a tapered cooling plug with air cushion according to another preferred embodiment of the invention.

FIG. 1 shows a molding apparatus generally indicated at 1 for the formation of pipe and in particular double wall pipe P at the downstream end of the apparatus. This pipe, which is better shown in FIG. 4 of the drawings comprises an outer wall OW having alternating crests and troughs and a flat inner wall IW which, as shown, has spaced apart regions adhered to the troughs in the outer wall.

Returning to FIG. 1, apparatus 1 includes an extruder 3 having an extruder head 5 which feeds molten plastic in a downstream direction to a pipe molding region generally indicated at 7. This pipe molding region is formed by an upper revolving mold block section loop 9 and a lower revolving mold block section loop 11 providing a moving mold tunnel for the formation of the pipe.

Figure 2:
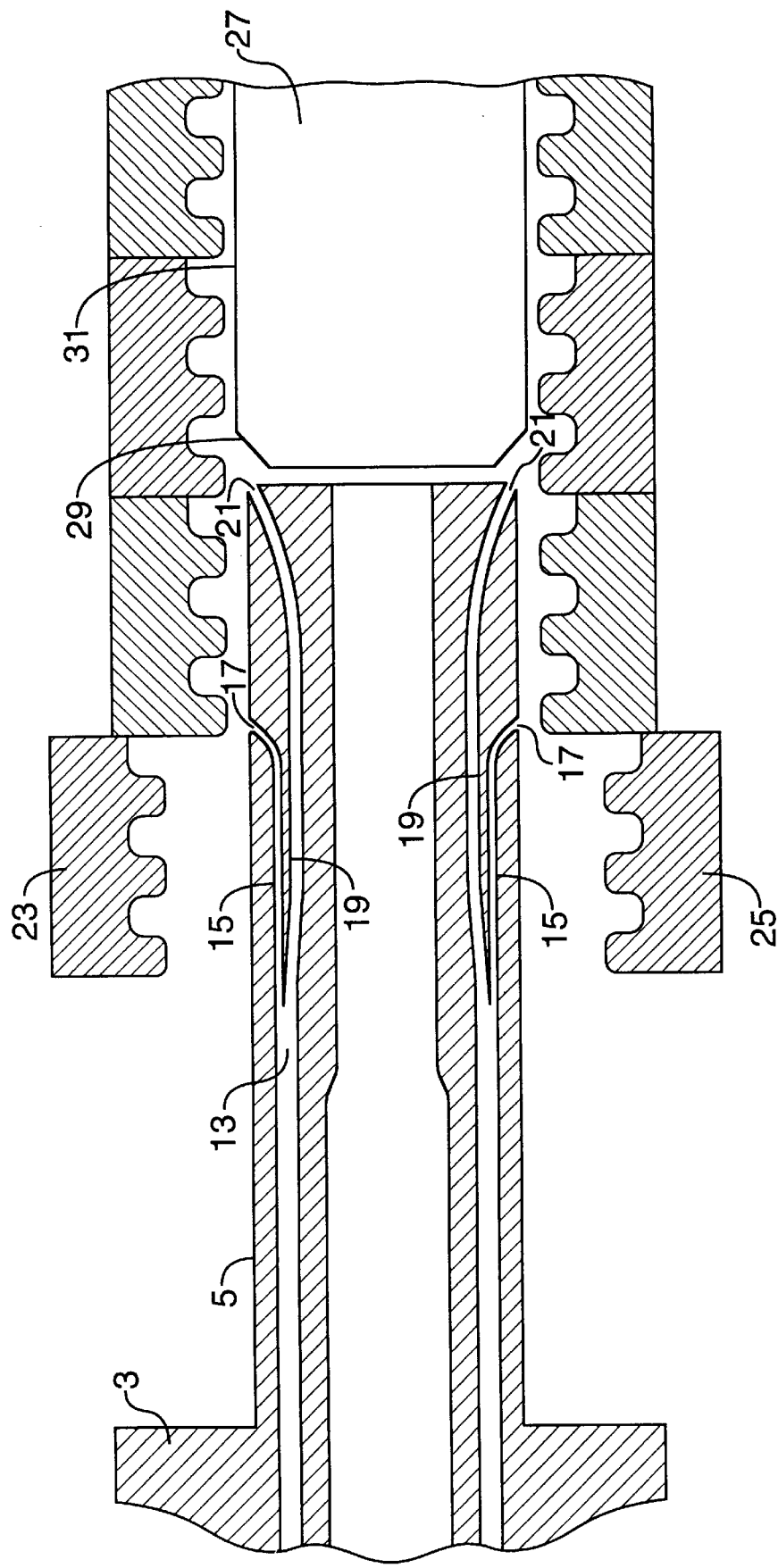
FIG. 2 is an enlarged sectional view through the forward end of the mold tunnel of FIG. 1 showing a tapered cooling plug with air cushion according to a preferred embodiment of the present invention.

FIG. 2 shows that the upper loop is provided with side by side mold block sections 23 while the lower loop is provided with side by side mold block sections 25. All of these mold block sections have profiled faces which shape the outer wall of the pipe.

FIG. 2 further shows that the extruder head 5 has a path 13 at the upstream end of the extruder head to receive plastic flowing from the extruder. Path 13 is divided in the extruder head as it enters the mold tunnel into further flow paths 15 and 19. Flow path 15 terminates in a mouth 17 while flow path 19 terminates in a mouth 21. As shown in FIG. 2, mouth 21 is downstream of mouth 17.

Figure 2A:
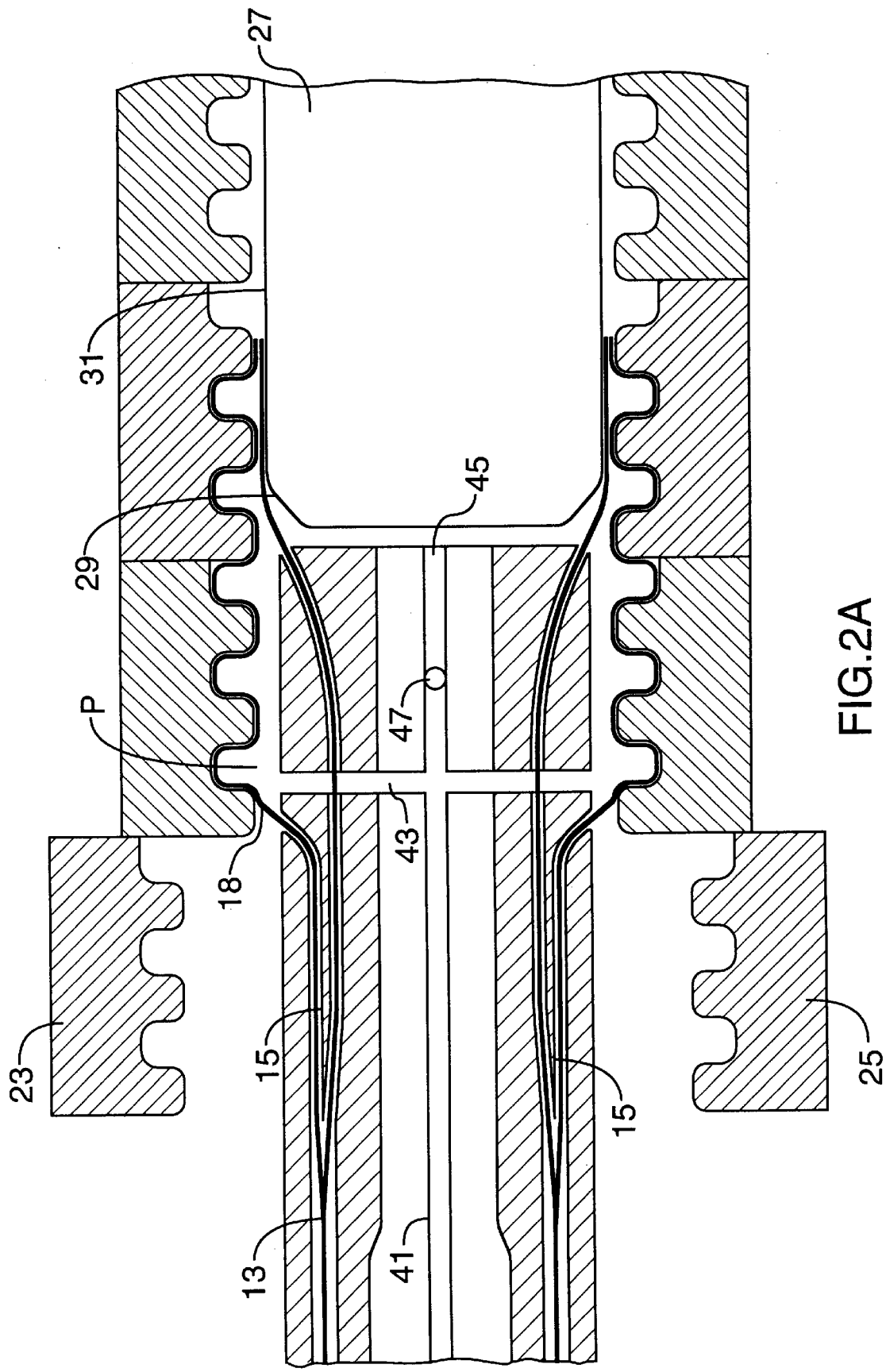
FIG. 2A is an enlargement of the forward end of the mold tunnel shown in FIG. 2.
Figure 3:
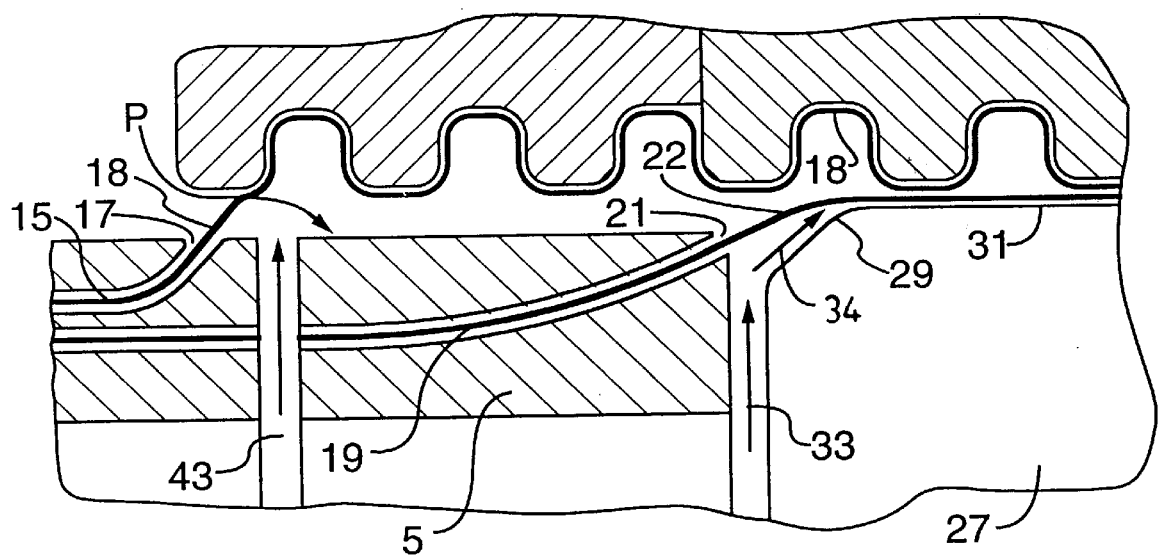
FIG. 3 is a further enlargement at the upstream end of the mold tunnel showing the extrusion of the inner pipe wall over the cooling plug of FIG. 2.

Molten plastic is extruded through path 13 of the extruder head where it is divided into first and second streams of plastic 18 and 22 along paths 15 and 19 respectively. The first stream of plastic 18 as shown in FIG. 3 is fed into the tunnel from the mouth 17 of the path 15 directly onto the profiled faces of the mold block sections 23 and 25. As is known in the art, vacuum may be used to pull the stream of plastic 18 onto the faces of the mold block sections and particularly into the trough regions of the mold block sections. In addition, positive air pressure indicated by P in FIG. 2A may be used to help lift the plastic stream 18 onto the faces of the mold block sections 23 and 25. This positive air pressure is produced by a stream of air along air passage 41 which branches as indicated at 43 to the interior surface of parison 18.

Further downstream in the mold tunnel the second stream of plastic 22 shown in FIG. 3 of the drawings enters the mold tunnel through the mouth 21 of flow path 19. This stream of plastic is once again directed outwardly at the interior faces of the mold block sections but is blocked from both the mold block sections and the vacuum through the mold block sections by the first stream of plastic 21. Accordingly, the second stream 22 is not pulled up into the troughs of the mold block sections but rather remains flat where, as noted above, spaced regions of the stream 22 adhere to the regions of the first stream 18 on the crests of the mold block sections.

As the stream 22 leaves the extruder head, it is immediately moved onto a cooling plug 27. The cooling plug is located as close as possible to, without cooling, the extruder head. This leaves only a very slight gap between the cooling plug and the extruder head. Cooling plug 27 has an outer surface wall 31 defining the main body portion of the cooling plug which is dimensioned relative to the mold tunnel so as to force the stream of plastic 22 outwardly onto the regions of the plastic stream 18 which lie on the crests of the mold block sections. Plug 31 further cools stream 22 while the stream 18 is being cooled by the mold block sections to cause the two streams of plastic to set up and adhere to one another.

According to the present invention, cooling plug 27 is provided with a front end neck 29 which, as shown in FIG. 3, tapers inwardly towards the extruder head. The taper along neck 29 has a gradual and smooth transition to the outer wall 31 of the main body of the cooling plug.

Two features according to the present invention are provided to prevent the parison 22 from catching on the front end of the cooling plug. The first of these features is the tapering of the neck 29 which eliminates sharp or abrupt edges at the front end of the cooling plug. Secondly is the provision of a cushion of flowing air indicated by arrow 34 flowing along tapered neck 29 internally of the second inner wall forming parison as shown in FIG. 3. This cushion of air which is produced by a stream of air 33 blown from the downstream end 45 of air passage 41 into the gap between the mold plug and the extruder head acts as an assist to move parison 22 along the neck and onto the main body of the plug.

As earlier noted there is a positive air pressure P acting on parison 18 upstream of cooling plug 27. This pressure also acts on and urges the second stream of plastic 22 to collapse inwardly. However, the air cushion which is provided from the same source of air that is used to produce pressure P acts as a counter force against pressure P. If wanted, the air cushion can be made strong enough by additional pressure sources, as described later in detail, to overcompensate pressure P and actually lift the inner parison 22 off of the neck and onto the main body of the cooling plug.

In as much, it is important to properly control pressure P, a check valve 47 is provided to prevent any excess pressure at the air cushion from blowing back down air passage 41. Valve 47 allows air to move in the downstream direction but does not allow air to move upstream past the valve.

Figure 6:
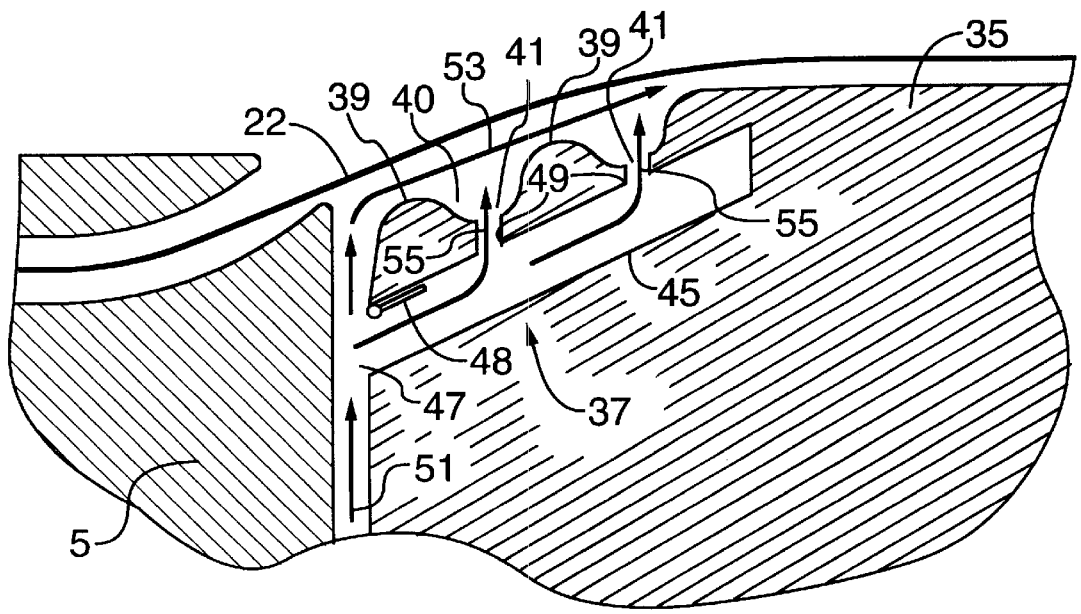
FIG. 6 shows the operation of the air cushion from the embodiment of FIG. 5.

FIG. 6 shows a further preferred embodiment of the invention in which a cooling plug 35 is provided at the downstream end of the extruder head 5. This particular cooling plug has a forward tapered neck generally indicated at 37 leading to the main outer wall 36 of the cooling plug. The inner pipe wall forming parison 22 is moved over neck 37 onto the outer wall 36 of the cooling plug.

FIG. 6 shows in further detail, the forward neck 37 of cooling plug 35. Here it will be seen that neck 37 is characterized by an undulating sine wave like surface comprising a series of rolling crests 39 separated by valleys 40. This results in a neck surface presenting very localized potential points of contact with the parison 22. Furthermore, these localized points of contact are, as shown, smoothly rounded to once again essentially eliminate possible marking on the interior surface of the inner wall forming parison.

Like the earlier described embodiment, a cushion of air is provided exteriorly along the neck of the cooling plug to assist the parison 22 onto the main body of the cooling plug. This cushion of air is provided by a main stream of air generally indicated at 51 provided along the gap between the extruder head and the cooling plug. Some of this stream of air continues as an air flow 53 outwardly along the neck 37. In addition, some of the air is directed into a channel 45 within the cooling plug immediately beneath the undulating surface of the neck. This channel 45 has a mouth 47 opening to the gap between the extruder head and the cooling plug. The portion of the air stream 51 that goes into channel 45 continues as streams 55 which flow through channel openings 49 outwardly towards the undulating neck surface. Openings 41 are provided in the troughs 40 of the neck surface and the streams 55 flow through these openings 41 forming small pockets of air between the crests 39 on the neck surface. These small pockets of air, in combination with the air steam 53, cushion the parison 22 away from the neck and as noted above, tend to assist the parison over the neck onto the main body of the plug.

As seen in FIG. 6, a three position valve 48 is provided at the mouth 47 of channel 45. In the FIG. 6 position, stream 51 flows in the pattern described immediately above, i.e. where some of the stream flows into channel 45 and some of the stream flows outwardly around the exterior surface of the neck.

By moving valve 48 through a 90° angle, the mouth 47 of channel 45 is closed causing all of the air to flow outwardly around the exterior surface of the plug neck.

By moving valve 48 through 180°, the outer end of the gap between the extruder head and the plug is sealed off and all of the air stream 51 is directed through the open mouth 47 into channel 45. Therefore, in this position, all of the cushioning air is provided from beneath the exterior surface of the neck of the plug.

Figure 7:
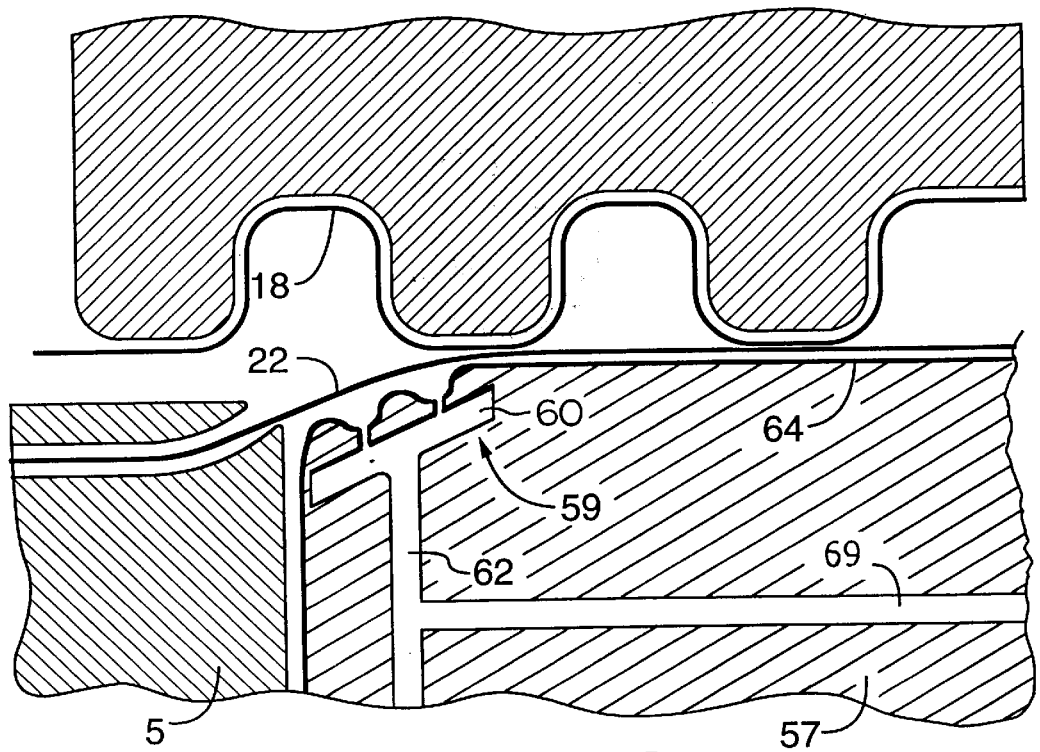
FIG. 7 is an enlarged sectional view of the forward end of a mold tunnel showing a tapered cooling plug with air cushion according to still a further preferred embodiment of the invention.

FIG. 7 shows still a further preferred embodiment of the present invention in which a cooling plug 57 has a front neck generally indicated at 59 leading to wall 64 defining the main body portion of the plug. In this embodiment as shown, a stream of air is fed into the gap between the die head and the cooling plug to provide an air cushion 58 over the exterior surface of neck 59. The neck is defined by rolling crests 61 with troughs or valleys 62 between the crests. A channel 60 is provided within the cooling plug immediately beneath the undulating neck surface. However, this channel does not open to the gap between the cooling plug and the extruder head but rather is contained completely within the cooling plug. Channel 60 is fed by a branch channel 62 which feeds from a main air supply channel 69.

Figure 8:
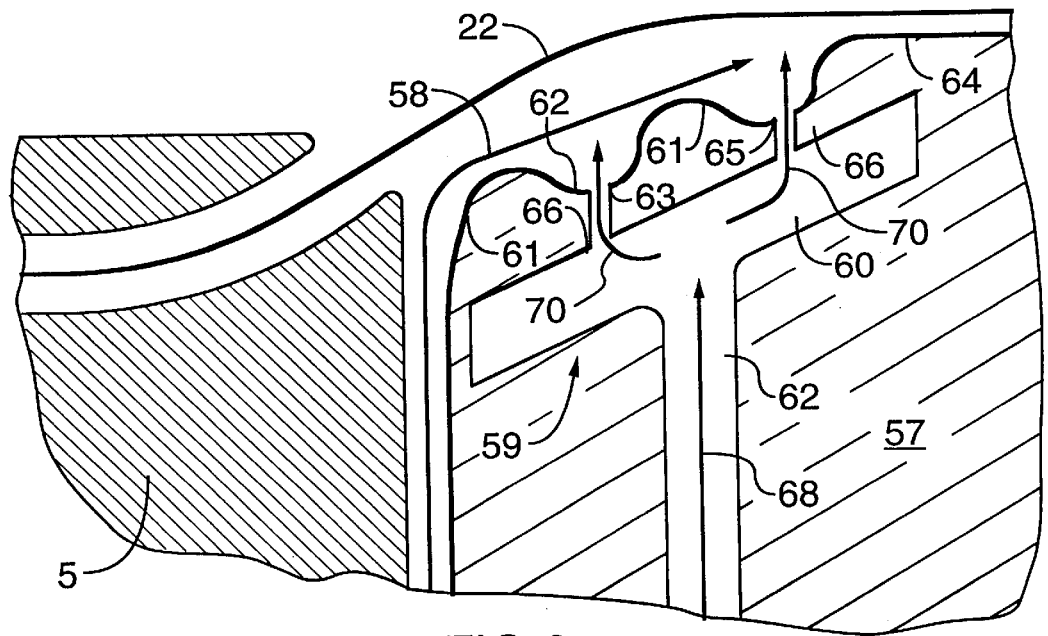
FIG. 8 shows the operation of the air cushion from the embodiment of FIG. 7.

Channel 69 within the cooling plug is connected to a main supply of air (not shown) from somewhere outside of the cooling plug. This main supply of air, as shown in FIG. 8, is fed as a stream of air 68 along the branch stream 62 to air channel 60 beneath the surface of the neck of the cooling plug. Channel 60 has openings 66, while the trough region 62 of the cooling plug neck has openings 63 and 65. These two sets of openings allow streams of air 70 to pass from the channel 60 into the trough regions of the cooling plug neck. These streams of air 70, once again provide localized pockets of air between the crests 61 of the cooling plug neck.

In the arrangement shown in FIG. 8, parison 22 can be assisted onto the main body of the cooling plug using a combination of cushion forming streams of air 58 and 70 as described above, or each of the steams of cushioning air can be used separately from one another, i.e. by shutting down the air flow through the mold plug, air stream 58 can provide the sole cushion of air for moving the parison onto the mold plug. In the alternative, air stream 58 can be shut down and air streams 70 used as the sole cushion of air for the parison.

It will now be seen from the above, how a combination tapered cooling plug neck and cushion of air is used to effectively flow a parison of plastic material onto the cooling plug without damaging the interior surface of the parison.

Although various preferred embodiments of the present invention have been described in detail, it will be appreciated by those skilled in the art, that variations may be made without departing from the spirit of the invention or the scope of the appended claims.

What is claimed is:

1. Apparatus for forming plastic pipe having an outer wall with alternating crests and troughs therealong and a flat inner wall having spaced apart wall regions adhered to the troughs in the outer wall, said apparatus comprising an extruder having an extruder head which feeds outer and inner wall forming first and second parisons of flowing plastic material to a moving mold tunnel, the moving mold tunnel having an interior surface to shape the outer wall of the pipe, a cooling plug interiorly of the mold tunnel and over which the second parison of plastic material moves in the mold tunnel, the cooling plug having a forward neck which is tapered inwardly towards said extruder head and a main body portion which is downstream of said forward neck and which is sized to urge the second parison outwardly towards the first parison while the first parison is forced against the interior surface of the mold tunnel, an air assist internally of and assisting said second parison over said forward neck and onto said main body portion of said cooling plug, an air channel interiorly of and having air movement openings through said forward neck to said air assist, a gap between said forward neck and said extruder head, and means for supplying air into said channel.

2. Apparatus as claimed in claim 1, wherein said air channel interiorly of said cooling plug has a channel mouth opening at said gap between said neck of said cooling plug and said extruder head, and further including means for supplying a flow of air into said gap through which the flow of air moves to said mouth of said channel.

3. Apparatus as claimed in claim 2, including a valve at the mouth of the channel, the valve being movable to one of three positions including a first position in which the mouth of said channel is open to said gap wherein the flow of air goes through both the gap and the channel, a second position in which the mouth of the channel is closed and the flow of air does not enter the channel and goes only through the gap and a third position in which the mouth of the channel is open and the gap is closed between the mouth of the channel and the neck of the cooling plug wherein the flow of air goes only through the channel to provide the air assist.

4. Apparatus as claimed in claim 1, wherein said air channel interiorly of said neck of said cooling plug is sealed from said gap between said cooling plug and said extruder head and wherein said cooling plug includes a further air channel interiorly of said main body portion of said cooling plug which feeds to said air channel in said neck of said cooling plug.

5. Apparatus as claimed in claim 1 wherein said neck of said cooling plug has a gently undulating exterior surface.

* * * * *